United States Patent

Han et al.

Patent Number: 5,818,903
Date of Patent: Oct. 6, 1998

[54] CDMA MOBILE AUTOMATIC CALL SIMULATING METHOD AND SIMULATOR THEREFOR

[75] Inventors: Ki-Chul Han; Duck-Bin Im; In-Myoung Jeong; Sang-Cheon Lee; Ki-Hong Kim; Min-Sik Seo, all of Daejeon; Hyun Lee, Seoul, all of Rep. of Korea

[73] Assignee: Electronics and Telecommunications Research Institute, Daejeon, Rep. of Korea

[21] Appl. No.: 717,805

[22] Filed: Sep. 24, 1996

[51] Int. Cl.⁶ .................................................. H04M 1/24
[52] U.S. Cl. ............................. 379/1; 379/10; 379/29; 455/67.1; 455/67.4; 455/67.7
[58] Field of Search ...................... 455/67.1, 67.4, 455/67.7; 379/5, 6–10, 13, 15, 21, 27, 29

[56] References Cited

U.S. PATENT DOCUMENTS

| | | |
|---|---|---|
| 3,692,961 | 9/1972 | Le Strat et al. . |
| 3,952,172 | 4/1976 | Penn et al. . |
| 5,384,822 | 1/1995 | Brown et al. . |
| 5,627,834 | 5/1997 | Han et al. ................................. 379/29 |
| 5,688,880 | 11/1997 | Alajaian ................................. 375/200 |

Primary Examiner—Curtis A. Kuntz
Assistant Examiner—Duc Nguyen
Attorney, Agent, or Firm—Nixon & Vanderhye, P.C

[57] ABSTRACT

An improved CDMA mobile automatic call simulating method and a simulator therefor which are capable of computing an accurate statistic data by repeating an actual CDMA call attempt and call incoming and by judging the result of the call attempt, which includes a management unit for communicating with the mobile stations and controlling the same in accordance with a previously set protocol, and a connection unit for communicating with the management unit and the mobile stations in accordance with an SDLC in an RS-422 signal method.

3 Claims, 9 Drawing Sheets

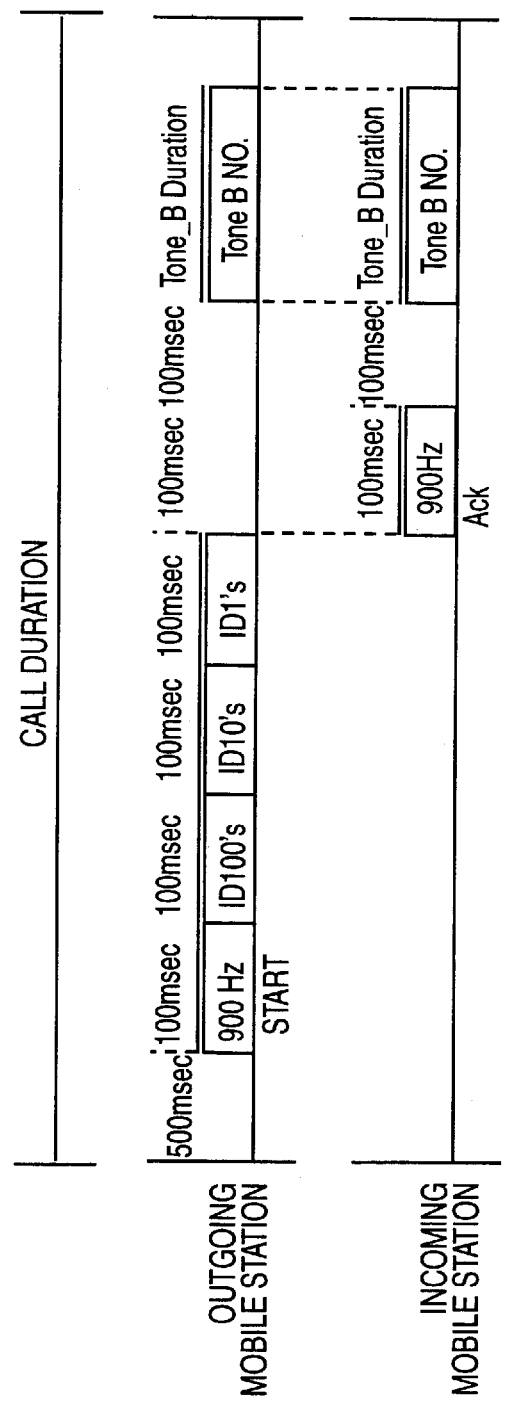

CDMA MOBILE AUTOMATIC CALL SIMULATING METHOD AND SIMULATOR THEREFOR

BACKGROUND OF THE INVENTION

1. Field of the Invention

The present invention relates to a CDMA mobile automatic call simulating method and a simulator therefor, and particularly, to an improved CDMA mobile automatic call simulating method and a simulator therefor which are capable of testing an automatic call of a mobile station of a digital type mobile communication system in a CDMA method.

2. Description of the Conventional Art

As the CDMA digital mobile communication system of a CDMA method develops, a device which is capable of checking a subscriber's line connection to a base station, a real call processing in a mobile station, and the function of a terminal itself, and the performance thereof is increasingly required. In order to perform a call processing, the performance test of the mobile communication system and the like, many call attempts and call receiving tests must be repeatedly performed by users. However, it is impossible to perform it using many people at a time, and to accurately compute a static data.

SUMMARY OF THE INVENTION

Accordingly, it is an object of the present invention to provide a CDMA mobile automatic call simulating method and a simulator therefor which overcome the problems encountered in the conventional CDMA mobile automatic call simulating method and a simulator therefor.

It is another object of the present invention to provide an improved CDMA mobile automatic call simulating method and a simulator therefor which are capable of computing an accurate statistic data by repeating an actual CDMA call attempt and call incoming and by judging the result of the call attempt.

It is another object of the present invention to provide an improved CDMA mobile automatic call simulating method and a simulator therefor which are capable of judging the call incoming and outgoing signal in cooperation with the PSTN call tester for communicating with the existing PSTN network.

To achieve the above objects, there is provided a CDMA mobile automatic call simulating method which includes the steps of checking whether a mobile station is an outgoing call mobile, attempting a call origination at the time when an idle state is ended when the mobile station is judged a call outgoing mobile in the checking step, processing a corresponding result selected from the group comprising an incoming call success, and service error, a call setup fail, a call drop, a no response call and a bad quality call in accordance with the current signal state or a predetermined signal state, receiving an incoming call at the time when the incoming call is received when the mobile station is not an outgoing call mobile in the checking step, processing a corresponding result selected from the group comprising an incoming call success, a bad quality call, and a no received tone in accordance with the state of the incoming call received in the receiving step, and ending the process when the number of the call attempts exceeds a predetermined number after performing the result processing step or the total checking time exceeds a predetermined time, and repeating the process from the checking process when the number of the call attempts does not exceed a predetermined number or the total checking time does not exceed a predetermined time, wherein the result processing step of the call outgoing mobile station includes the substeps of processing a call as a "no service error" when either a current state is not a traffic state, or a no service is indicated in a message transmitted from the mobile station when attempting an outgoing signal when the mobile station is out of a CDMA system service region, or a no service is indicated in a message of the mobile station when a call drop occurs at the time of attempting a call, processing a call as a "call setup failure" when either a current state is not a traffic state, or a message of the mobile station only indicates a call failure, or the mobile station does not normally process a call, processing a call as a "no response call" when either a current state is not a release state and an idle state but is a traffic state, or a ring back tone is continued for a predetermined time, processing a call as a "release state or an idle state" when either a current state is not a release state and an idle state but is a traffic state, or a ring back tone is not continued for a predetermined time, processing a call as a "call drop" when a call is not maintained for a predetermined time at the time of a normal call attempt, and the state of the mobile station is transited from the traffic state to either the release state or the idle state, processing a call as a "bad call" when a call is normally processed but the result of the received tone exceeds a reference level or is defective, or the FER exceeds a reference, and processing a call as a "call outgoing success" when the result of the FER or the received tone are good when the mobile station maintains a call in a traffic state for a predetermined time, and wherein the call incoming mobile station result processing step includes the substeps of processing a call as a "bad quality call" when a normal call incoming is proceeded but the state of the received tone is lower than a reference value or the FER exceeds a reference value, processing a call as a "no receiving state" when a call is normally proceeded but there is no a received call, and processing a call as a "incoming call success" when the state of the received tone is good or the FER is lower than the reference value while the received call is maintained.

To achieve the above objects, there is provided a CDMA mobile automatic call simulator which includes a management unit for communicating with the mobile stations and controlling the same in accordance with a previously set protocol, and a connection unit for communicating with the management unit and the mobile stations in accordance with an SDLC in an RS-422 signal method, wherein the management unit includes a control unit connected to the management unit by using a commercial serial communication port for selecting a corresponding mobile station in accordance with a command directed to select a specific mobile station from the management unit for a communication with the specified mobile station, and for controlling the mobile stations, and a tone generation and detection unit for transmitting and receiving a specific tone and for checking a communication state after the mobile station is in a communication state and for confirming whether the received tone is identical to the transmitted tone.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a view illustrating the outgoing procedure of various frequency tones according to the present invention.

DETAILED DESCRIPTION OF THE INVENTION

Figure 1:
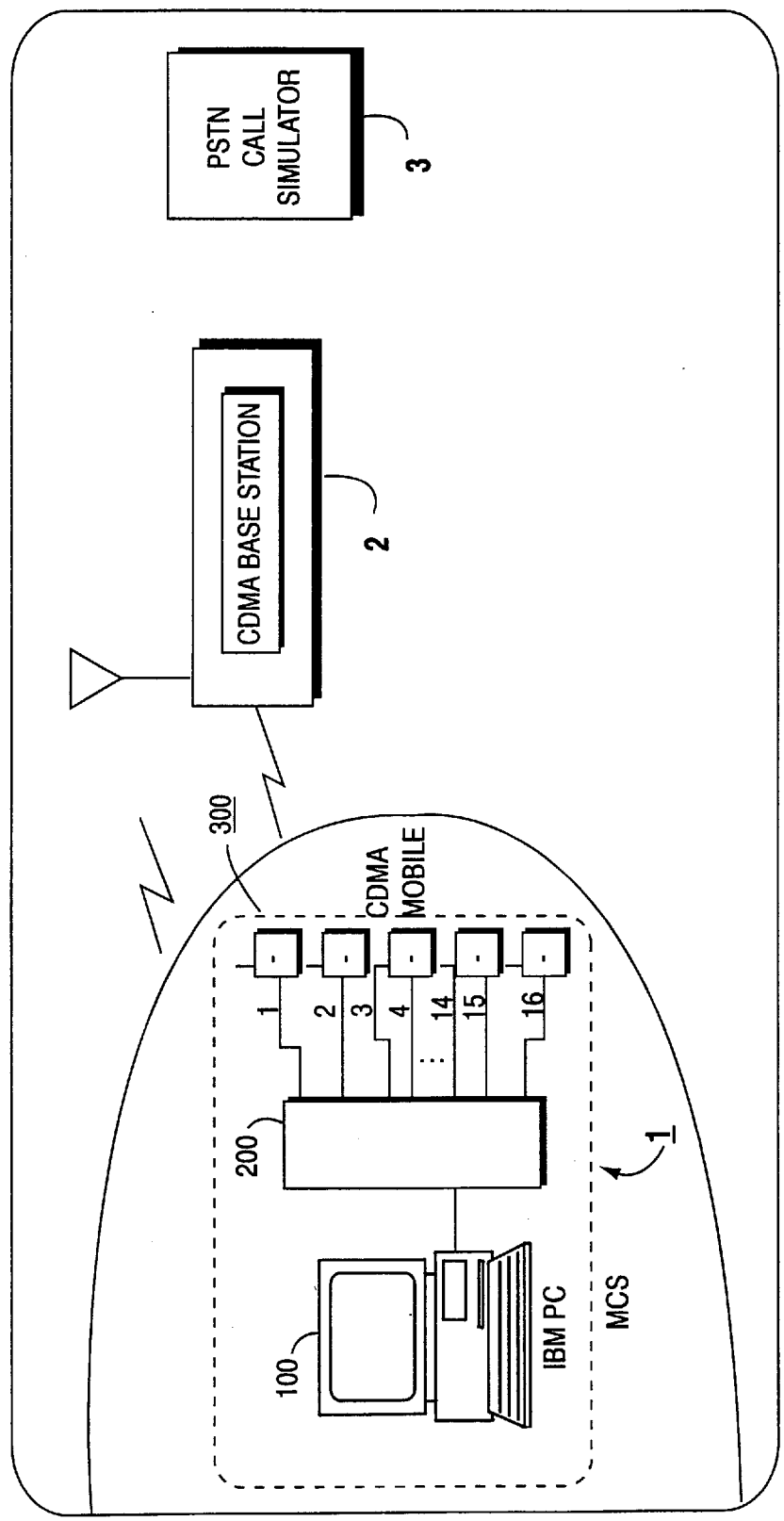
FIG. 1 is a view illustrating the construction of a mobile call simulator (MCS) of a CDMA mobile communication system according to the present invention.

FIG. 1 is a view illustrating the construction of a mobile call simulator (MCS) of a CDMA mobile communication system according to the present invention.

As shown therein, a call attempt and a call receiving are automatically repeated by the MCS 1. In accordance with the attempted call, the call incoming from the mobile station of the MCS is processed by a CDMA station. In addition, the PSTN call is processed by a PSTN call simulator 3. A base station 2 transmits a call receiving signal which indicates whether the call attempt of the mobile station is successful. The MCS 1 receives the call incoming signal transmitted from the base station through an air interface. The MCS 1 judges the result of the call attempt and computes an accurate statistic data.

Figure 2:
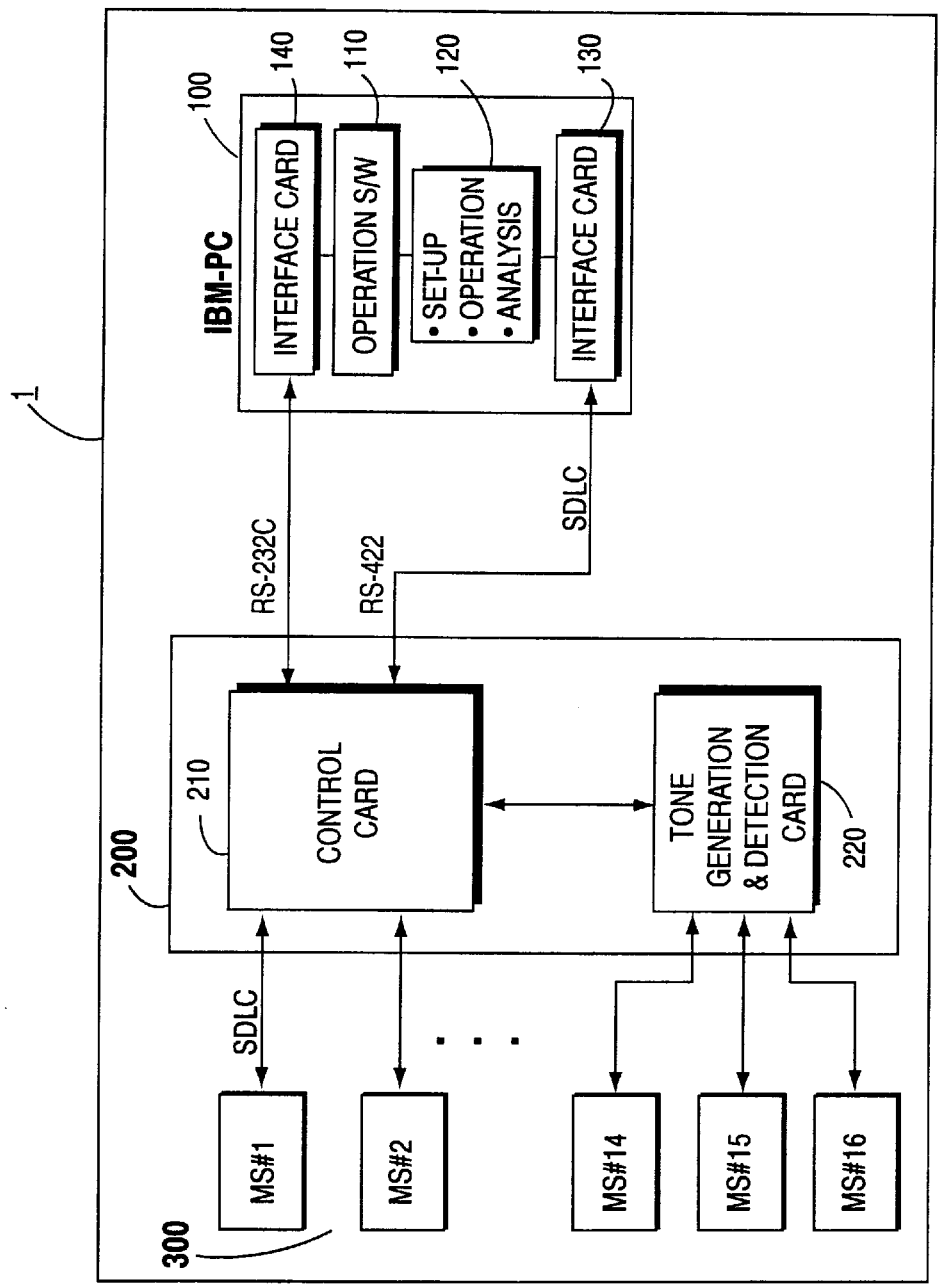
FIG. 2 is a block diagram of an MCS according to the present invention.

FIG. 2 is a block diagram of an MCS according to the present invention. The construction of the MCS 1 will now be explained with reference to FIG. 2.

The MCS 1 comprises a mobile station 300, a management unit 100, and a connection unit 200.

The mobile station 300 denotes a CDMA mobile station, and uses a commercial CDMA vehicle-based mobile station. This CDMA vehicle-based mobile station includes an interface port for a serial communication with an externally connected unit. The communication interface spec is provided by a manufacturer of the CDMA vehicle-based mobile station. The connection unit 200 and the mobile station 300 are connected through the communication port. The mobile station 300 is controlled by the management unit 100 in accordance with a previously set protocol.

An IBM personal computer which is used as the management unit 100 includes an internal slot, to which a communication card 130 is installed and is connected to the connection unit 200. The management unit 100 includes a management system 110, and a management software 120 is driven by the management system 110. The communication card 130 installed in the slot of the personal computer 100 communicates with a control card installed in the connection unit 200 in accordance with an RS-422 signal communication method based on an SDLC communication method. Here, the used communication card is a common commercial communication card, and works at 57.6 Kbps.

The connection unit 200 comprises a control card 210 and a tone generation and detection card 220. The control card 210 is connected to an RS-232C serial communication port 140 of the management unit 100 for controlling sixteen mobile stations 300. The control card 210 selects a predetermined connection port of the mobile station in accordance with the command for selecting the specific mobile station by the management unit 100 in order for a communication with the designated mobile station to be made. The receiving commands such as a call attempt and a call receiving which are selected by the management unit 100 communicate with the specific mobile station through the control card 210 in accordance with the communication protocols which are provided by the manufacture of the mobile station. The tone generation/detection card 220 transmits and receives a specific tone so as to confirm the communication quality after the mobile station 300 is in a communication state.

Figure 3:
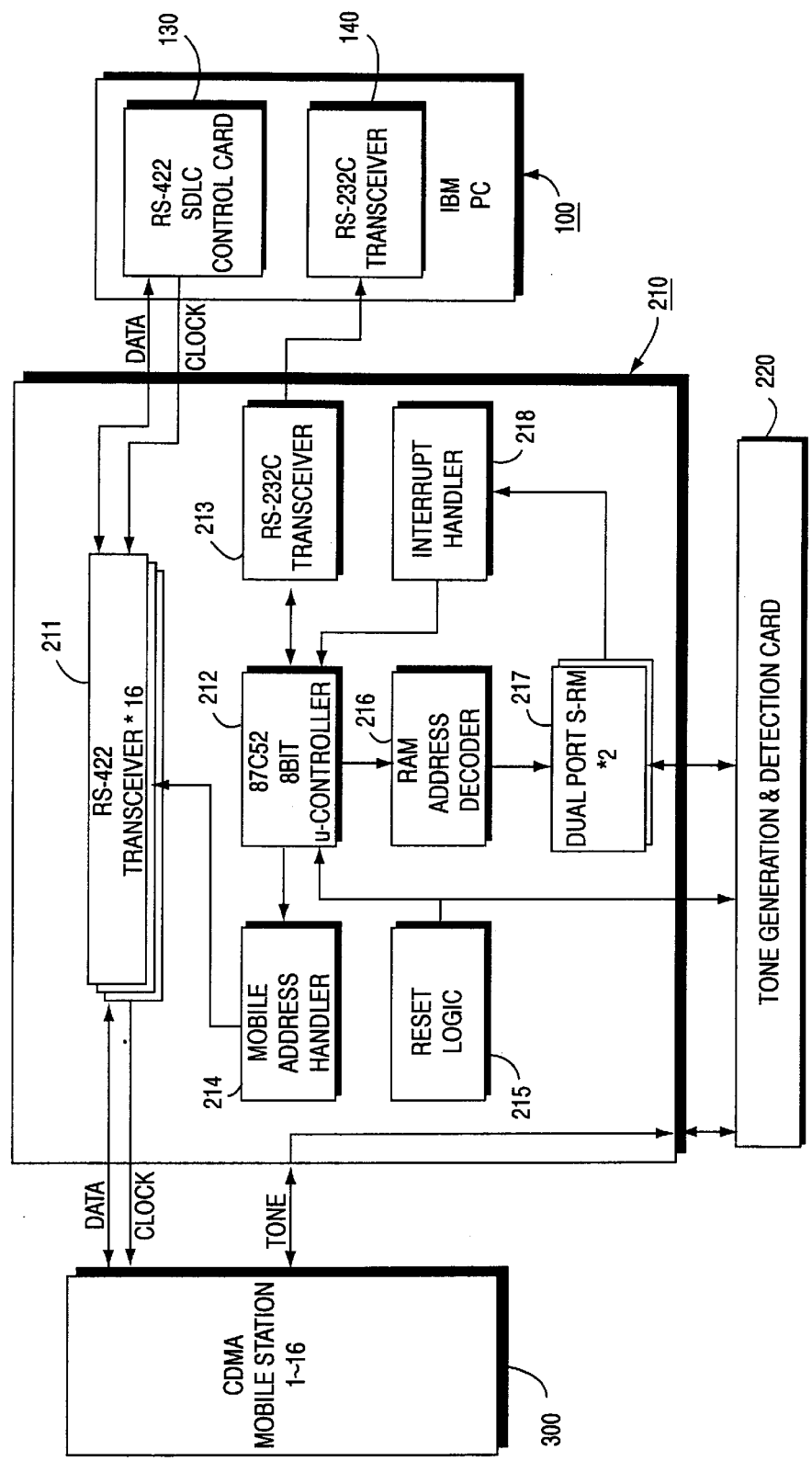
FIG. 3 is a block diagram of a control card of an MCS according to the present invention.

FIG. 3 is a block diagram of a control card of an MCS according to the present invention. The control card of the MCS unit will now be explained with reference to FIG. 3.

The control card 210 communicates data between an RS422 SDLC interface card 130 of the management unit 100 and a CDMA mobile station 300 through sixteen serial communication port RS-422 transceiver 211. In addition, the RS-422 transceiver 211 receives a clock signal from the RS-422 SDLC interface card 130 of the management card 100 and transmits the signal to the CDMA mobile station 300. An 87C52 eight bit micro-controller 212 receives a predetermined command from the management unit 100, controls the sixteen mobile stations 300, and transmits the result of the control to the management unit 100. Here, the 87C52 eight bits micro-controller 212 is connected to the RS-232C transceiver 140 of the management unit 100 through the serial communication port RS-232C transceiver 213 for a communication therebetween. The data is communicated between the 87C52 eight bits micro-controller 212 and the management unit 100. At this time, when an interference is applied from the management unit 100, an interrupt handler 218 is quickly reported of the interrupt. Thereafter, the interrupt handler 218 inputs the interrupt number to the 87C52 micro-controller 212 and enables the 87C582 eight bits micro-controller 212 to perform the interrupt. The 87C52 eight bits micro-controller 212 stores data in two dual port S-RAM 217 through a RAM access decoder 216. The dual port S-RAM 217 communicates data with the tone generation/detection card 220. When an interrupt occurs by the tone generation/detection card 220, the interrupt number is stored in the dual port RAM 217. The interrupt handler 218 takes an interrupt number of the dual port RAM 217 and inputs the interrupt number to the 87C52 eight bits micro-controller 212, so that the 87C52 eight bits micro-controller 212 performs the interrupt. The 87C52 eight bits micro-controller 212 selects a mobile station for a connection therebetween, searches a corresponding channel of the mobile station using the mobile station access handler 214, and communicates data with the corresponding CDMA mobile station 300 through the RS-422 transceiver 211. The mobile station access handler 214 controls the RS-422 transceiver 211 and connects to the mobile station corresponding to the address of the mobile station designated by the 87C52 eight bit micro-controller 212. A reset logic circuit 215 redrives the 87C52 eight bits micro-controller 212 and the tone generation/detection card 220. In addition, the tone generation/detection card 220 communicates with the mobile station through the control card 210 for transmitting/receiving the tone.

Figure 4:
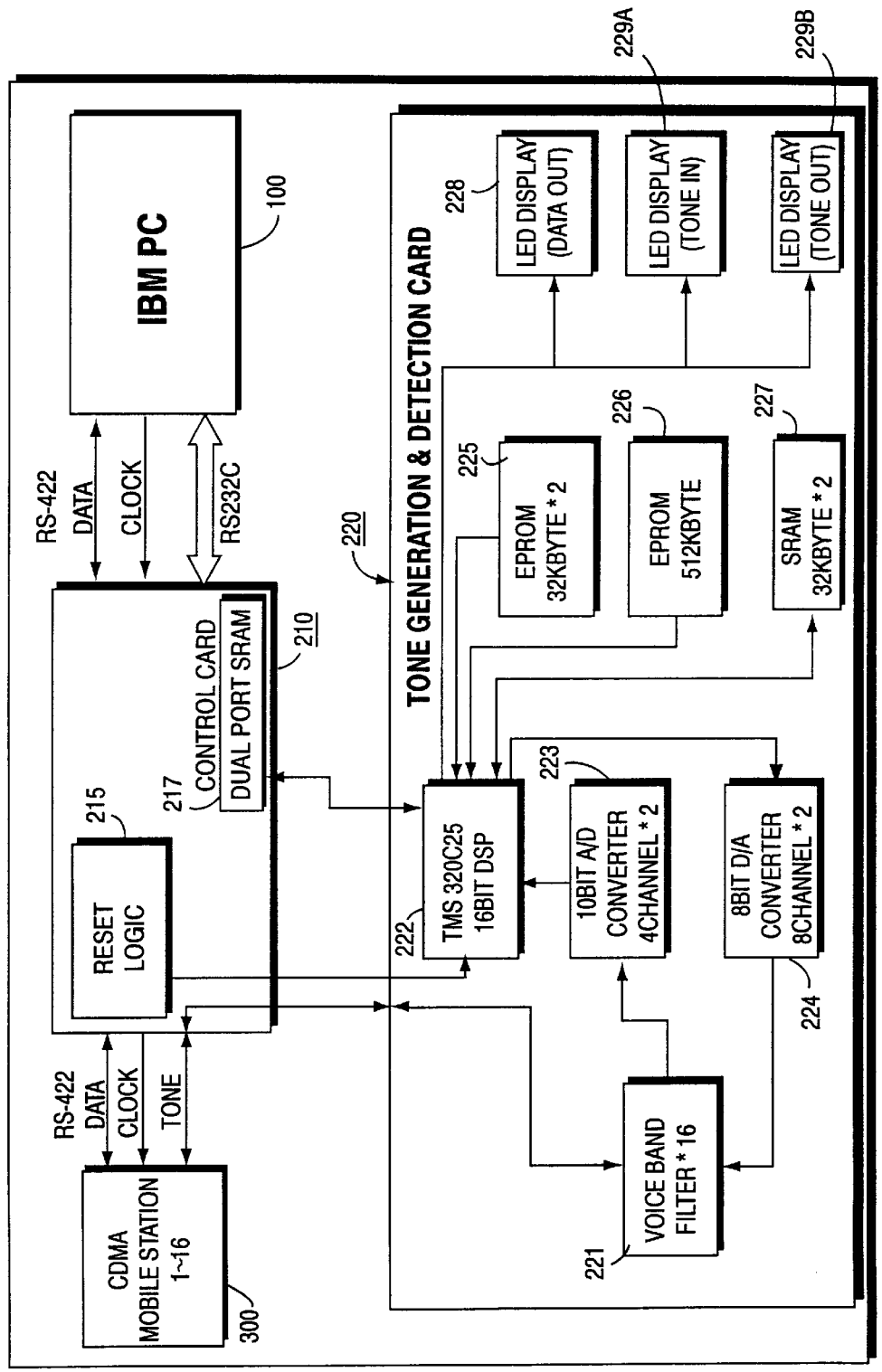
FIG. 4 is a block diagram of a tone generation/detection card of an MCS according to the present invention.

FIG. 4 is a block diagram of a tone generation/detection card 220 of an MCS according to the present invention. The tone generation/detection card of the MCS will now be explained with reference to FIG. 4.

The tone generation/detection card 220 is connected to an audio input/output portion of the mobile station tone transmitting/receiving unit for transmitting/receiving the tone through sixteen voice band filter 221. The voice and the tone having a previously set frequency is stored in the EPROM 26 of 512 Kbyte in the tone generation/detection card 220. A TMS 320C25 sixteen bits digital signal processor (DSP) 222 converts the audio signal stored in the EPROM 226 of 512 Kbyte and the tone into an analog signal by an eight bits D/A(digital to analog) converter 224 having eight channels formed by two units in accordance with a previously set cycle. The audio or tone converted by the D/A converter 224 is transmitted through the voice band filter 221. The tone received through the voice band filter 221 is converted into the digital signal by the A/D (analog to digital) converter 223 and is inputted into the DSP 222. The DSP 222 process the inputted signal based on the fast-Fourier-transform (FFT) by 32 msec. It is judged whether the tone received as a result of the FFT processing is identical to the transmitted tone, and then the communication quality is measured. The EPROM 226 of 512 Kbyte outputs an FFT algorithm to the DSP 222. Variables of the FFT in the DSP 222 are stored in two SRAMs 227. In addition, the DSP 222 drives the tone input LED display 229A and displays a state that the tone is inputted. When transmitting a data or a tone using the tone transmitting/receiving unit, the DSP 222 drives the LED display 229A and the data output LED display 229B, and displays a content that the tone is inputted.

The management software 120 works in the personal computer of the management unit 100, and all the mobile stations 300 is controlled by using the management unit 100. The operational state of each mobile station and the results of the call attempt are displayed on the screen of the personal computer. The result data after the call attempt is performed is written in a hard disk of the personal computer as a file. It is possible to check the operational state of all the mobile station and the operational state and the call attempt result of each mobile station using the call attempt result data file.

Figure 5:
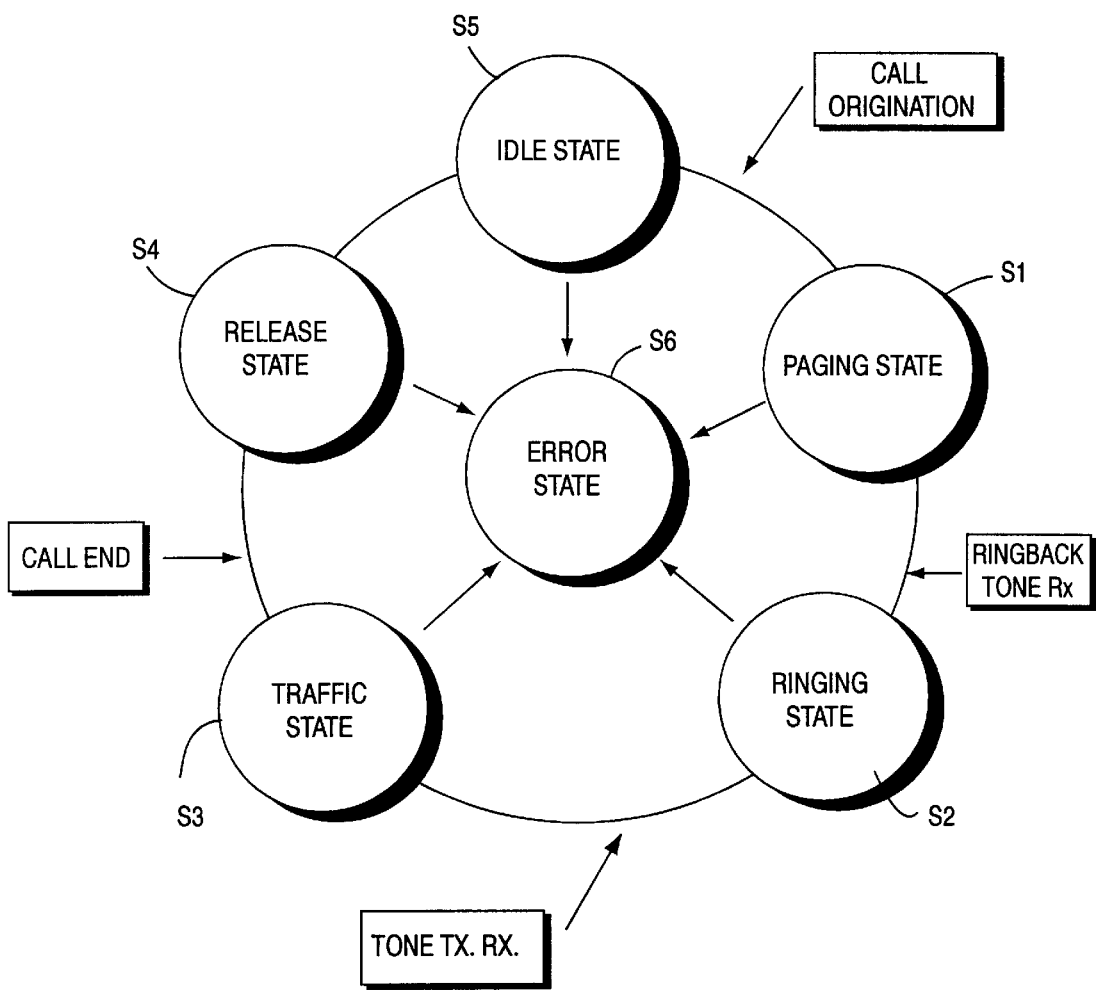
FIG. 5 is a view illustrating the operational state of a call control mode according to the present invention.
Figure 6:
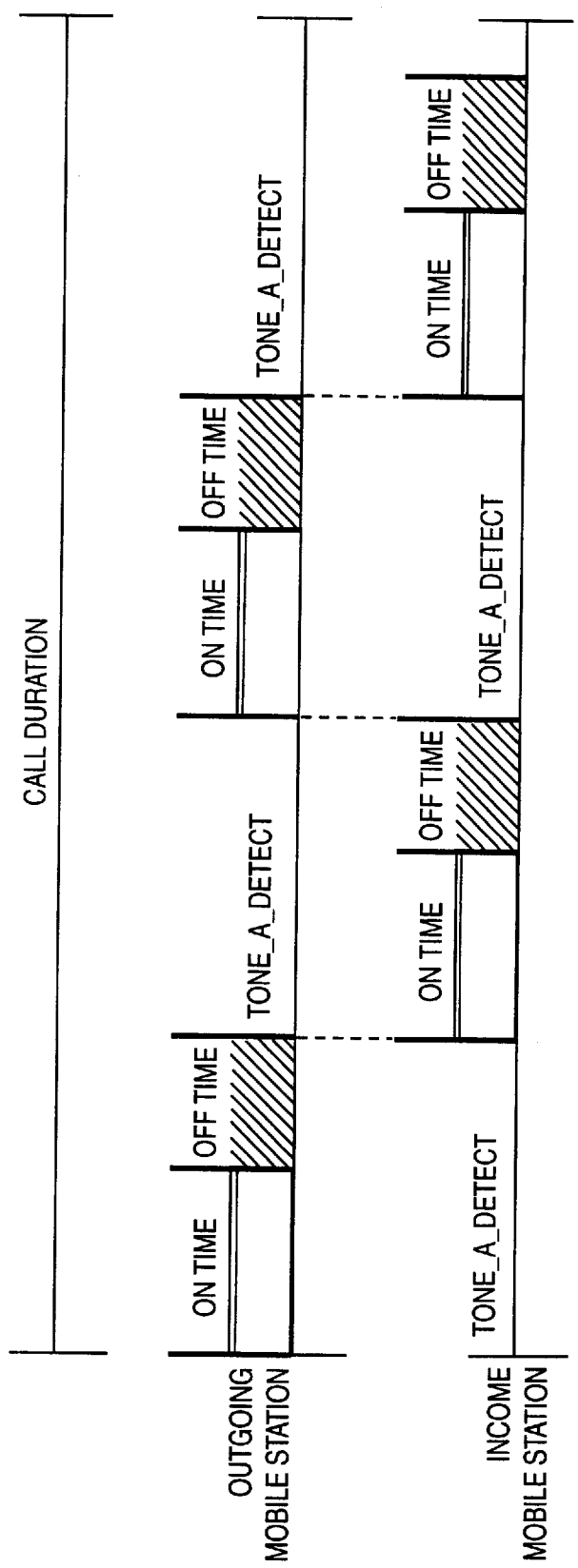
FIG. 6 is a view illustrating an 800 Hz tone outgoing procedure.

FIG. 5 is a view illustrating the operational state of a call control mode, and FIG. 6 is a view illustrating an 800 Hz tone transmitting procedure, and FIG. 7 is a view illustrating the tone transmitting procedure of various frequency tones according to the present invention. The call attempt control operation with respect to a call control mode will now be explained with reference to FIGS. 5 through 7.

In a paging step S1, a call origination message is transmitted to the mobile station, and the paging step S1 denotes a state until a ring back tone is generated. If the CDMA system fails to setup a call within a set time, or if there occurs an error in the data transmitted from the mobile station 300, the process is resulted in a call failure. In the MCS 1, the internal state of the mobile station 300 is checked, and the operational state thereof is judged, and is transited to a ringing step S2.

In the ringing step S2, the ring back tone generated by the mobile station 300 is detected by the tone generation/detection card 220, and the tone is maintained for a predetermined time. When the tone transmitted from the call receiving mobile station is transmitted or the ring back tone receiving is terminated, step S2 is transited to a traffic step S3. A parameter, such as a received power level (dBm), connected to the CDMA system is transmitted from the mobile station 300 in the intermediate state of the traffic step S3 and is written in the hard disk. In the traffic mode of the MCS 1, the tone generation/detection card 220 is selected and operated in accordance with a recorded audio and a specific tone transmission. In the real mode, a user directly communicates. A result is judged in accordance with the frame error rate (FER). The audio signal is written in the EPROM 10 of 512 Kbyte of the tone generation/detection card 220 and is transmitted through the D/A converter 11. A specific tone transmission is performed by two kinds for communicating with the PSTN call tester. When transmitting the tone, the tone generation/detection card 220 generates a tone of a predetermined frequency and tone and transmits the tone to another mobile station. The frequency and level of the tone received to the mobile station 300 is checked, and the quality of the communication is measured. The result thereof is displayed on the monitor of the management unit and is written in the hard disk.

As shown in FIG. 6, the single tone of 800 Hz is alternately communicated between the call outgoing mobile station and the call incoming mobile station. The tone is transmitted for an on-time operation in accordance with a cycle of an on-time and off-time. During the off-time operation, the tone is not transmitted. The call incoming mobile station first transmits the tone and the call outgoing mobile station transmits the tone after a lapse of the off-time. The received tone detection is performed during the traffic step S3.

As shown in FIG. 7, the tones of various frequencies are combined into three tones and are transmitted from the call outgoing mobile station. Namely, three digits identification number and single tone number are combined. Only the call outgoing mobile station transmits an identification number, and the call incoming mobile station receives an identification number, and transmits a response. The call outgoing mobile station starts transmitting the identification number tone after transmitting the tone corresponding to the frequency of 900 Hz which indicates a state that the tone is transmitted. The transmission time of an individual tone is 100 msec. The tone corresponding to the response of the call incoming mobile station is 900 Hz. The call outgoing/incoming mobile station concurrently transmits the single tone for a predetermined time after the identification number is transmitted, and the transmission time is determined by the user. In the traffic step S3, if an error occurs at the earlier stage of the operation, and the call is impossible, and if the call termination occurs within the set communication tone, step S3 is transited to an error step S6. However, when the communication is normally operated, the step S3 is transited to a release step S4.

In the error step S6, the causes of the communication failure at the earlier stage, and the call terminations are written, and the error step S6 is transited to an idle state. The FER in the busy step of the communication is displayed on the monitor of the management unit 100, and is written in the hard disk.

In the release step S4, the call end command is transmitted to the mobile station in a state that the communication duration time is ended. Namely, the release step S4 is denotes a state until the communication of the mobile station is transited to the communication ended step. In addition, the management unit 100 judges the result related to the call attempt, and displays the judgement on the monitor of the management unit 100, and the result is written in the had disk, and step is transited to the idle step S5.

In the idle step S5, the communication is in an idle state for the next call after the release is completed. This is determined by the user.

Figure 8A:
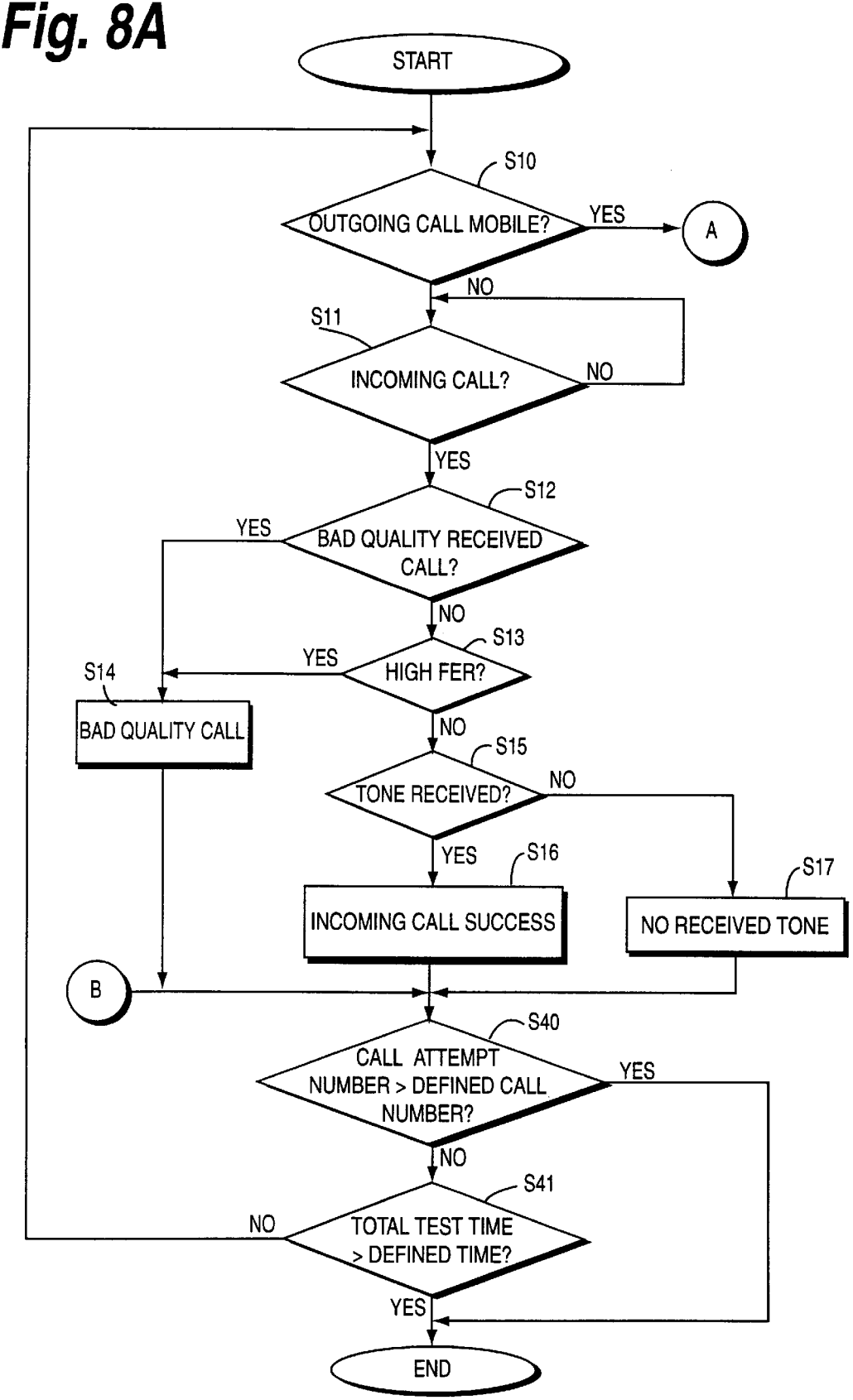
FIGS. 8A and 8B are flow charts of an MCS operation and a call attempt procedure according to the present invention.
Figure 8B:
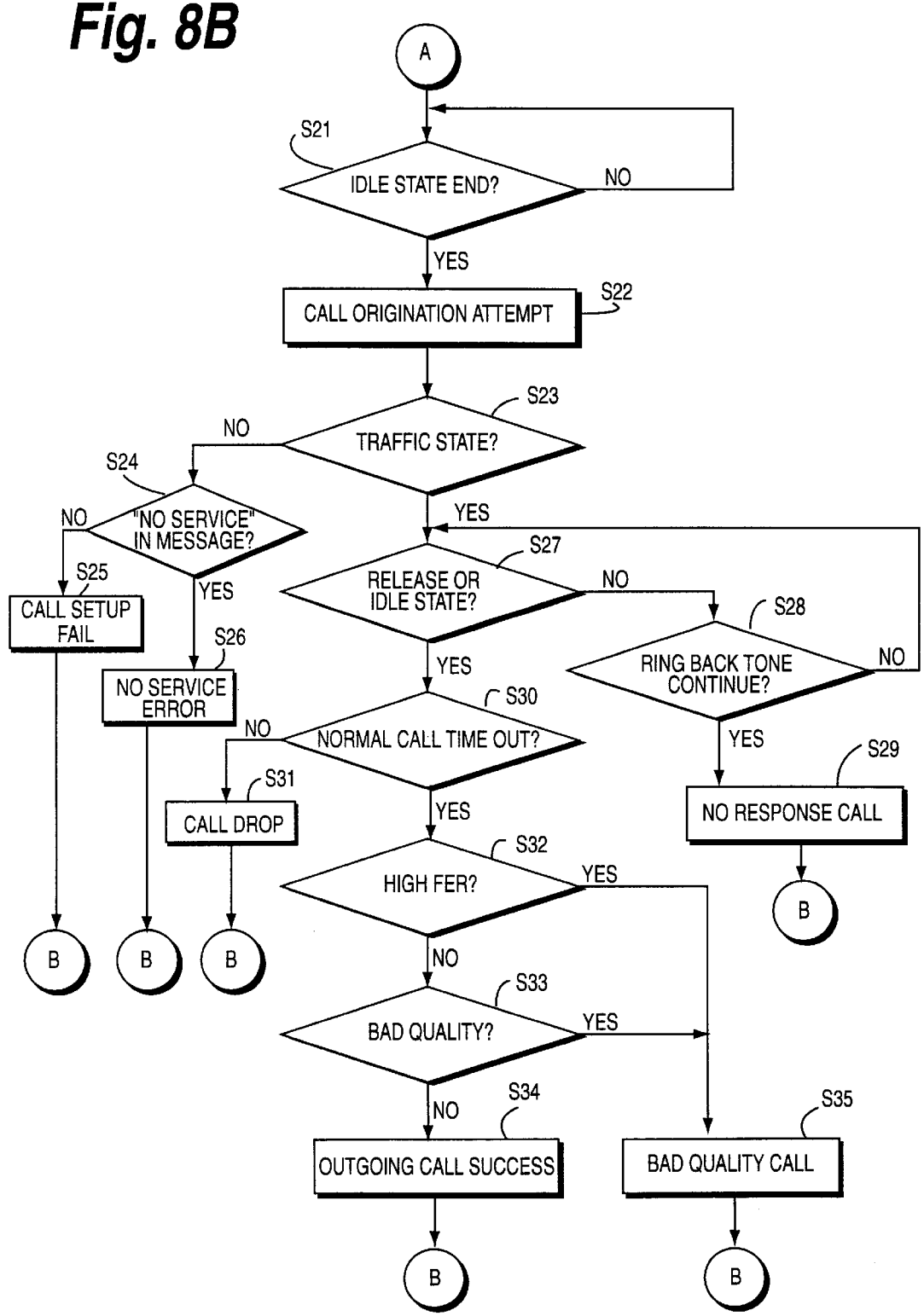

FIGS. 8A and 8B are flow charts illustrating the MCS management and call attempt processing procedure. The MCS management and call attempt process procedure will now be explained with reference to the accompanying drawings.

The result of all calls is processed after each call is ended and is in the release step. The results of the call outgoing mobile station and the call incoming mobile station are separately processed. The kind of the call attempt result of the call outgoing mobile station is divided into the number of call transmitting successes, a no service error, a call setup failure, a call drop, a no answer, and a bad communication state. The kind of the call attempt result of the call incoming mobile station is divided into a call receiving success, a bad communication state, and a no receiving tone.

The kind of the call attempt result of the call outgoing mobile station will now be explained in more detail. The call transmitting success denotes the FER which is lower than a reference level when a call is maintained when the mobile station is in the traffic state during a set time. In addition, the no service error denotes a state that no service error is displayed in accordance with a message transmitted from the mobile station when attempting a call signal transmission. In this case, the mobile station is out of the CDMA system service region. In addition, when a call drop occurs during a calling, the no service is also displayed in accordance with a message transmitted from the mobile station. The call setup failure denotes a state that a call failure is displayed in accordance with a message transmitted from the mobile station after a lapse of two seconds after a call signal is attempted. In addition, if the call process is not performed normally due to the abnormal state of the mobile station, the call setup is processed as the call setup failure. The call drop denotes a state that the operational state of the mobile station is transited to the idle step from the traffic step. Namely, the call is not maintained normally during a predetermined time duration while the call is normally performed. The no response denotes a state that the ring back tone is continuously received for a predetermined time in the ringing step. The call failure state denotes a state that while the call is normally performed, the result of the received tone exceeds a predetermined level, or the FER exceeds a predetermined reference.

The kind of the signal incoming mobile station call attempt result will now be explained in more detail. The call receiving success denotes a state that the state of the received tone while the received call is maintained is normal, or the FER is lower than the reference level. The receiving state failure denotes a state that after a normal call receiving is performed, the state of the received tone is lower than the reference level, or the FER exceeds a reference level. The no receiving tone denotes a state that after the normal call is performed, a received call does not exist.

In step S10, it is judged whether the call is from a call outgoing mobile station.

In step S10, if the call is not from the call outgoing mobile station, step S11 is not performed until the incoming call occurs.

In step S12, it is judged whether the state of the incoming tone exceeds a reference.

In step S12, it is judged that the state of the received tone exceeds the reference, and in step S13, it is judged whether the FER exceeds a reference.

In step S12, if its is judged that the state of the received tone does not exceed the reference, or if it is judged that the FER exceeds the reference in step S13, a bad quality call is processed in step S14.

In step S13, if it is judged that the FER does not exceed the reference, it is judged whether the tone is received in step S15.

In step S15, if it is judged that the tone is not received, a no received tone process is performed in step S17.

After the processes of steps S14, S16, or S17, it is judged whether the number of call attempts exceeds a predetermined number in step S40.

In step S40, if it is judged that the number of the call attempts exceeds a predetermined number, the process is ended.

In step S40, if the number of the call attempts does not exceed a predetermined number, it is judged whether the total attempt time exceeds a predetermined time in step S41.

If it is judged that the total attempt time exceeds a predetermined time, the process is ended.

In step S41, if it is judged that the total attempt time does not exceed a predetermined time, step S10 is processed. In step S10, if it is judged a call outgoing mobile station, the process becomes idle until the idle state is ended in step S21.

In step S22, the call origination is attempted.

In step S23, it is judged whether the process is in the traffic state.

If it is judged that the process is not a traffic state in step S23, it is checked whether a no service is displayed in the message in step S24.

In step S24, if the no service is not displayed, or if the call is not normally processed by the mobile station, in step S25, a call setup failure is performed, and step S40 is performed.

When the mobile station is out of the CDMA system service region in step S24, if the no service is displayed in accordance with a message transmitted from the mobile station when transmitting a signal in step S24, or if the no service is displayed in accordance with the message transmitted from the mobile when a call drop occurs at the time of a call processing, in step S26, the no service error is performed, and then step S40 is performed.

In step S23, if it is judged the traffic state, it is judged whether the state of the mobile station is transited to the release state or the idle state in step S27.

If it is judged that the state is transited into neither the release state nor the idle state, it is judged whether the ring back tone is continuously performed in step S28.

In step S28, if it is judged that the ring back tone is not continued, step S27 is performed.

If it is judged that the ring back tone is continuously performed, in step S29, the process is processed as a response call, and then step S40 is processed.

In step S27, if it is judged that the state of the mobile station is transited from the traffic state to either the release state or the idle state, it is judged whether the call is maintained for a predetermined time in accordance with the call which is normally processed in step S30.

If it is judged that the call is not maintained for a predetermined time during the normal call processing, a call drop is processed in step S31, and step S40 is performed.

In step S30, if it is judged that the call is maintained for a predetermined time during the normal call processing, in step S32, it is judged that the FER exceeds the reference value.

If it is judged that the FER does not exceed the reference, it is judged whether the result of the received tone exceeds a reference value.

If it is judged that the result of the received tone is good in step S33, the call outgoing success is processed in step S34, and step S40 is processed.

In step S32, if it is judged that the FER exceeds a reference value or it is judged that the result of the tone received in step S33 is bad, a bad call is processed in step S35, and step S40 is processed.

The present invention is directed to sequentially controlling sixteen mobile stations which is the CDMA vehicle telephones. The control card of the connection unit enables and controls the communication port of a specific mobile port in accordance with a selected command of the mobile station transmitted from the management unit.

First, when setting the call outgoing mobile station and the call incoming mobile station, sixteen mobile stations are classified into the call outgoing mobile station and the call incoming mobile station. The call outgoing mobile station serves for the call outgoing among other processes, and the call incoming mobile station serves for the call incoming.

Second, when generating a synchronous mode call and an asynchronous mode call, the call may be generated in accordance with the synchronous mode which all mobile stations attempt a call at the same time, and the call may be generated in accordance with the private mode operation.

Third, the failure of the call is recorded and analyzed. In addition, when the call attempt and call incoming failed, the causes of the failure is analyzed.

Fourth, the number of call attempts during a calling, the number of failures, and the rate of the success are gathered and are displayed on the screen. Namely, the number of the call attempts, the number of the failure, and the success rate are displayed on the screen of the monitor, and the number of the failures and the rate of the success are displayed on the screen and are stored.

Fifth, the attempt result data filed in stored, and the failure cause analyzing method is processed.

Therefore, the CDMA mobile automatic call incoming method and a simulator therefor according to the present invention communicates with the call incoming/outgoing between the mobile stations and the PSTN call tester, for thus effectively confirming the call attempt result of the call incoming/outgoing signal.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A CDMA mobile automatic call simulating method comprising the steps of:

checking whether a mobile station is an outgoing call mobile;

attempting a call origination at the time when an idle state is ended when the mobile station is judged a call outgoing mobile in the checking step;

processing a corresponding result selected from the group comprising an incoming call success, and service error, a call setup fail, a call drop, a no response call and a bad quality call in accordance with the current signal state or a predetermined signal state;

receiving an incoming call at the time when the incoming call is received when the mobile station is not an outgoing call mobile in the checking step;

processing a corresponding result selected from the group comprising an incoming call success, a bad quality call, and a no received tone in accordance with the state of the incoming call received in the receiving step; and ending the process when the number of the call attempts exceeds a predetermined number after performing the result processing step or the total checking time exceeds a predetermined time, and repeating the process from the checking process when the number of the call attempts does not exceed a predetermined number or the total checking time does not exceed a predetermined time.

2. The method of claim 1, wherein said result processing step of the call outgoing mobile station includes the substeps of:

processing a call as a "no service error" when either a current state is not a traffic state, or a no service is indicated in a message transmitted from the mobile station when attempting an outgoing signal when the mobile station is out of a CDMA system service region, or a no service is indicated in a message of the mobile station when a call drop occurs at the time of attempting a call;

processing a call as a "call setup failure" when either a current state is not a traffic state, or a message of the mobile station only indicates a call failure, or the mobile station does not normally process a call;

processing a call as a "no response call" when either a current state is not a release state and an idle state but is a traffic state, or a ring back tone is continued for a predetermined time;

processing a call as a "release state or an idle state" when either a current state is not a release state and an idle state but is a traffic state, or a ring back tone is not continued for a predetermined time;

processing a call as a "call drop" when a call is not maintained for a predetermined time at the time of a normal call attempt, and the state of the mobile station is transited from the traffic state to either the release state or the idle state;

processing a call as a "bad call" when a call is normally processed but the result of the received tone exceeds a reference level or is defective, or the FER exceeds a reference; and processing a call as a "call outgoing success" when the result of the FER or the received tone are good when the mobile station maintains a call in a traffic state for a predetermined time.

3. A CDMA mobile automatic call simulating method of claim 1, wherein said call incoming mobile station result processing step includes the substeps of:

processing a call as a "bad quality call" when a normal call incoming is proceeded but the state of the received tone is lower than a reference value or the FER exceeds a reference value;

processing a call as a "no receiving state" when a call is normally proceeded but there is no a received call; and processing a call as a "incoming call success" when the state of the received tone is good or the FER is lower than the reference value while the received call is maintained.

* * * * *